US006809316B2

(12) United States Patent
Kato

(10) Patent No.: US 6,809,316 B2
(45) Date of Patent: Oct. 26, 2004

(54) ELECTROSPRAY IONIZATION MASS ANALYSIS APPARATUS AND SYSTEM THEREOF

(75) Inventor: Yoshiaki Kato, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 10/221,844

(22) PCT Filed: Feb. 1, 2002

(86) PCT No.: PCT/JP02/00859

§ 371 (c)(1), (2), (4) Date: Feb. 11, 2003

(87) PCT Pub. No.: WO03/065406

PCT Pub. Date: Aug. 7, 2003

(65) Prior Publication Data

US 2003/0155497 A1 Aug. 21, 2003

(51) Int. Cl.$^{7}$ ................................................ B01D 59/44

(52) U.S. Cl. ....................... 250/288; 250/281; 250/310; 250/307

(58) Field of Search ................................ 250/288, 281, 250/310, 307; 205/655; 435/2

(56) References Cited

U.S. PATENT DOCUMENTS 5,464,975 A * 11/1995 Kirchner et al. ............ 250/283
5,504,329 A 4/1996 Mann et al.
6,541,767 B1 * 4/2003 Kato .......................... 250/288

FOREIGN PATENT DOCUMENTS

JP 6-13015 1/1994
JP 6-201650 7/1994
JP 10-10109 1/1998
JP 2000-164169 6/2000
JP 2001-357815 12/2001

OTHER PUBLICATIONS

Shen et al., "High Throughput Chemical Analysis by Improved Desorption/Ionization on Silicon Mass Spectromtery", (Pub. No: US 2003/0057106 A1 ), published Mar. 27, 2003.*

* cited by examiner

*Primary Examiner*—John R. Lee
*Assistant Examiner*—Zia R. Hashmi
(74) *Attorney, Agent, or Firm*—Dickstein Shapiro Morin & Oshinsky LLP

(57) ABSTRACT

Because of a low flow rate of the micro LC/MS, the dead volume or the diameter of a capillary tube must be minimized, and a sample and salt are likely to deposit in the capillary tube, with the result that clogging of the capillary tube and ESI nozzle often occurs. An electrospray ionization mass analysis apparatus and its system of the present invention predicts clogging, permit earlier cleaning or parts replacement, and detect clogging even if it has occurred, thereby suspending measurement and preventing samples from being introduced into an injector, with the result that waste of samples is avoided and effective data is ensured.

The aforementioned electrospray ionization mass analysis apparatus directly coupled to the micro LC prevents a micro LC, piping and ESI capillary tube from being clogged, and records an alarm in the data and stops the system whenever clogging has occurred, whereby highly reliable direct coupling with micro LC is ensured.

In the aforementioned electrospray ionization mass analysis apparatus and its system, a sample solution from a chromatograph is introduced into a capillary tube, and an electrospray ion source arranged for generating ions under atmospheric pressure generates ions, which are led into a mass spectrometer disposed in a vacuum chamber where the ion is subjected to mass analysis. The current value or strength of the ion having a specified mass in the sample solution is measured, and, when the current value has reduced below a threshold value, an error state is displayed.

24 Claims, 8 Drawing Sheets

ELECTROSPRAY IONIZATION MASS ANALYSIS APPARATUS AND SYSTEM THEREOF

FIELD OF THE INVENTION

The present invention relates to an electrospray ionization mass analysis apparatus and system thereof, wherein a sample solution eluting out of a low flow rate chromatograph such as a micro liquid chromatograph is led to an electrospray ion (ESI) source and is ionized therein, and the ions generated in this ion source are fed to a mass spectrometer arranged in a highly vacuum space, where the ions are subjected to mass analysis.

BACKGROUND OF THE INVENTION

In recent years there has been a remarkable growth in biological researches over diversified fields. Especially, protein, peptide and DNA play an extremely important role in the living body, and have been the objects of study by a great number of research workers. Generally, these organic compounds derived from living organism occur in a very small amount in complicated matrices. There has been a growing demand for extracting a very small amount of these biological organic compounds from the living body and analyzing them using a mass spectrometer directly coupled with liquid chromatograph LC/MS apparatus) with a high degree of sensitivity. The LC/MS apparatus is an apparatus for separating a mixture with a liquid chromatograph (LC) and providing qualitative and quantitative analysis using a mass spectrometer (MS) with a high degree of sensitivity. Electrospray ionization (ESI) is typical ionization means used in the LC/MS. The ESI is ionsization technique used under atmospheric pressure and is known as providing soft and highly sensitive ionization. For this reason, this method has come to be used very often for biological analysis.

To ensure stable and highly sensitive measurement of a very small amount of components using the aforementioned ESI, some parameters must be optimized. One of these parameters is the flow rate that determines the amount of solution to be supplied to the ESI ion source. To achieve highly sensitive measurement, the flow rate of the solution flowing through the ESI capillary tube must be kept within a certain range. In ESI, the optimum flow rate is said to lie in the range from 10 nL/min. ($10^{-8}$ L/min) to several μL/min ($10^{-6}$ L/min). If a solution is fed into the ESI capillary tube at a flow rate higher or lower than this level, the ESI ionization will become unstable and anticipated highly sensitive measurement will not be achieved. U.S. Pat. No. 5,504,329 discloses an art for ESI improvement for providing highly sensitive measurement of a very small amount of components. The art disclosed therein was later called Nanospray technique. After the tip of an extra-fine capillary tube made of glass having an outer diameter of about 0.2 mm and inner diameter of about 0.03 mm has been elongated by a burner or sharpened by etching, the nozzle tip is gold plated. The D.C. voltage of about 1 kV supplied from the high voltage source is applied to the tip of the nozzle. The flow rate of a sample solution from a nanospray device ranges from is several nL/min (several $10^{-9}$ L/min.) to 10 nL/min (several $10^{-8}$ L/min.). Measurement for more than one hour was enabled by only the sample sucked into the nanospray spray capillary tube. Accordingly, this nanospray technique has come to be used in combination with extra-low flow rate chromatography in CE (Capillary Electrophoresis); further, it has come to be used for extremely highly sensitive measurement of isolated components. The nanospray technique has enabled ESI measurement in the range of flow rate below 10 nL/min.

In the micro LC field, the flow rate is extremely small, below several μL/min. and a big problem is raised by the dead volume of the LC parts and the pipe connection among the parts thereof. When the dead volume between the micro-column and detector is greater for the flow rate, the sample components separated by the micro-column will be dispersed and mixed among them, with the result that separation and sensitivity will be lost a substantially. Further, the dead volume between the LC pump and micro-column will cause a problem of the delay in gradient elution. This requires the dead volume to be minimized.

Gradient elution is a method for quick elution of the sample component by changing the composition of the eluent with the lapse of time. This gradient elution technique is improves the separation of the sample components. This improves the S/N ratio and reduces the measurement time at the same time. Accordingly, LC is used extensively.

In micro LC, even if the start of gradient is specified and multiple pumps have fed out solvent at a predetermined flow rate, a long time is required before the composition of the eluent is changed in the micro-column. This delay raises a problem. This is called a delay in gradient elution.

Assume that a pump 1 is now feeding out solvent A at 20 μL/min. Also assume that a pump 2 starts to feed out solution B at the rate of 0.2 μL/min. at a predetermined time. A mixer and a pipe regionrranged between pumps 1 and 2 and micro-column. If their volume is 5 μL, the delay of gradient will be 5/0.2=25 min. Namely, gradient is effectively started in the micro-column 25 minutes after the pump 2 started to feed solution B. This makes it difficult to ensure correct separation and analysis by micro LC. In order to improve this delay of gradient elution, it is important to reduce the size of the mixer and dead volume. The dead volume can be decreased by reducing the pipe diameter or pipe length. However, reduction of pipe diameter raises a new problem of easy clogging of the pipe. Especially when a biological sample is to be analyzed, a biological macromolecule such as sugar and protein present in the sample as well as NaCl and salts will cause clogging of the pipe. Further, separation of protein requires salt having a high concentration of 100 mM or more to be added to the mobile phase in many cases. This salt of high concentration is deposited in the dead volume of the pipe, with the result that the pipe is clogged in the final stage. Accordingly, the frequently used system in the micro LC is a micro LC system where A semimicro or conventional LC pump is used up to gradient solution feeding, and the eluent is split immediately before the inlet. A great volume (1 mL/min. to 0.1 mL/min.) of solvent is used up to the pump, mixer and pipe, so the dead volume among them can be ignored. In other words, the problem of delay in gradient elution has been solved. The split eluent at a very small flow rate (10 to several μL/min.) is led to the micro column through the injector. This method has a disadvantage that the greater part of solvent must be discarded by the splitter, but it solves the aforementioned problem of the delay in gradient resulting from dead volume, and ensures economical configuration of the system. For these merits, this method has come to be used over a wide range.

The Japanese Application Patent Laid-Open No. 06-13015 discloses ions implantation apparatus for evaluating a trouble such as equipment failure, displacement by comparing with the reference value the status value of a particular peak in a mass spectrum. The Japanese Application Patent Laid-Open No. 10-10109 discloses an apparatus for avoiding damage of the optical detector cell resulting from a clogged flow path in a mass analysis apparatus directly coupled with a liquid chromatograph, the aforementioned mass analysis apparatus being designed to ionize and detect the component leaching therefrom.

The micro LC wherein the solvent is split before the micro column can be said as an extension of the general-purpose LC and semimicro LC technology. So since the micro LC is capable of analyzing a trace quantity of sample, it is expected to find a widespread use in the field of biological technologies. According to this method, however, the major portion of solvent is split and discarded as waste, and the amount of solvent flowing into the micro column is no more than one hundredth to one tenth of the solvent supplied to the splitter. So even if the ESI capillary are clogged by salt or protein and the solvent cannot be led to the micro column, solvent only flows to the waste liquid. Since solvent pressure is released to atmospheric pressure by the splitter, pressure is not changed by clogging of the micro column. Thus, clogging of the analysis column or ESI capillary is not detected, with the result that the sample will be continuously fed from the automatic sampler Since the clogging of the micro column or piping is not detected. No solvent flows in the vicinity of the injector, and washing is not carried out by solvent, so the automatic sampler and injector will be contaminated by the sample. A large amount of data file from which any mass spectrum or chromatogram cannot be acquired will be stored in the memory of a control data processor. What is more crucial is that precious samples will be consumed in vain by clogging of the micro column. Further, it is not clear when the micro column was clogged, with the result that data reliability will be placed under suspicion.

Further, the aforementioned Laid-open Publication does not disclose any means for detecting the clogging of a capillary tube or ESI nozzle caused by deposition of salts due to low flow rate and for suspending measurement, thereby avoiding waste of samples in the micro LC/MS, or any specific device for predicting the possible clogging of the capillary tube.

DISCLOSURE OF THE INVENTION

The object of the present invention is to provide an electrospray ionization mass analysis apparatus and the system thereof that ensure effective data at all times during measurement, by utilizing means for detecting the clogging of a capillary tube or ESI nozzle caused by deposition of salts due to low flow rate and for suspending measurement, thereby avoiding waste of samples in the micro LC/MS, or by predicting the possible clogging of the capillary tube.

In an electrospray ionization mass analysis apparatus directly coupled with a micro LC, the present invention prevents clogging of the micro LC column, piping and ESI capillary, and records the alarm in the data and stops the system whenever any clogging has occurred, thereby ensuring highly reliable direct connection with the micro LC.

The present invention provides an electrospray ionization mass analysis apparatus wherein;

eluate from a chromatograph is introduced into the capillary tube, and an electrospray ion source arranged for generating ions under atmospheric pressure generates ions, which are led into a mass spectrometer disposed in a vacuum chamber where the mass spectrum is given. This electrospray ionization mass analysis apparatus is characterized in that the current value of the ion of a specific mass is monitored, and, when this ion current value has reduced below a threshold value, a flag is set to indicate an error.

Further, the present invention provides an electrospray ionization mass analysis apparatus wherein eluate from a chromatograph is introduced into the capillary tube, and an electrospray ion source arranged for generating ions under atmospheric pressure generates ions, which are led into a mass spectrometer disposed in a vacuum chamber where the mass spectrum is given. This electrospray ionization mass analysis apparatus is characterized in that the ion current value of a specific mass is monitored more than once for each sample, and an approximate expression is formed from multiple ion current values monitored subsequent to measurement of multiple samples, to predict the number of sample measurements where the ion current value is below the threshold value, whereby a warning is displayed on a CRT.

The ESI operates as follows: Voltage of several kilovolts is applied between a metallic capillary having an inner diameter of about 0.1 mm and a counter electrode arranged at some distance (about several tens of mm) away therefrom. When a sample solution is led to the metallic capillary and a high voltage is applied, the liquid in the capillary is dielectrically polarized at the capillary outlet by a high electric field formed on the tip of a metallic capillary. In the positive ionization mode, positive electric charge is induced on the liquid surface, while in the negative ionization mode, negative electric charge is induced on the liquid surface.

As a result, a conical liquid called Taylor cone is pulled out into the atmosphere from the capillary outlet by electric field. If electric field is stronger than the surface tension at the tip of the Taylor cone, electrically charged extremely fine droplets are released into the atmosphere from the tip of the Taylor cone. In conformity to electric field, the generated charged droplets fly in the atmosphere toward a counter electrode to repeat collision with molecules in the atmosphere. This allows charged droplets to be mechanically broken, and evaporation of solvent from the droplet surface is promoted so that charged droplets are quickly pulverized. In the final stage, ions in charged droplets are released into the atmosphere. The ion flies in the atmosphere toward a counter electrode and is led into a highly vacuum mass spectrometer through a capillary tube or aperture arranged in the counter electrode where it is subjected to mass analysis.

Further, the present invention provides an electrospray ionization mass analysis apparatus wherein eluate from a chromatograph is introduced into the capillary tube, and an electrospray ion source arranged for generating ions under atmospheric pressure generates ions, which are led into a mass spectrometer disposed in a vacuum chamber where the mass spectrum is given. This electrospray ionization mass analysis apparatus is characterized by sequentially comprising:

- a step of introducing the aforementioned sample into the injector and micro column of the chromatograph in that order,
- a step of separating the sample for each component and ionizing it after feeding into the aforementioned ion source in conformity to the lapse of time,
- a step of repeating mass sweeping with the aforementioned mass spectrometer and storing the collected mass spectra into the control data processor,
- a step of measuring the current value (Is) of the ion having a specific mass in the sample, and comparing between the measured Is and the threshold value (It),
- a step of continuing measurement if Is exceeds It,
- a step of completing measurement if the Is is not below the It by the time the aforementioned measurement terminates, and starting measurement of the next sample,
- a step of indicating an error through the control data processor if the error has occurred where the Is is reduced below the It due to sudden reduction of the Is, and specifying the action to be taken to correct the error,
- a step of giving a command of suspending start of sweeping to the mass sweep power source of the mass spectrometer to suspend the collection of mass spectra,
- a step of recording an error in the data and displaying that warning, and
- a step of suspending transmission of the signal for starting the next sample measurement to an automatic sampler.

Further, the present invention provides an electrospray ionization mass analysis apparatus similar to the above characterized by sequentially comprising:

- a step of introducing the aforementioned sample into the injector and micro column of the chromatograph in that order,
- a step of separating the sample for each component and ionizing it after feeding into the aforementioned ion source in conformity to the lapse of time,
- a step of repeating mass sweeping with the aforementioned mass spectrometer and storing the collected mass spectra into the control data processor,
- a step of measuring the current value (Is) of the ion having a specific mass, and comparing between the measured Is and the threshold value (It),
- a step of continuing measurement if Is exceeds It,
- a step of completing measurement if the Is is not below the It by the time the aforementioned measurement terminates, and starting measurement of the next sample,
- a step of suspending the collection of mass spectra due to abrupt reduction of the Is,
- a step of indicating an error without suspending the collection of mass spectra during the measurement of one sample by liquid chromatograph (LS),
- a step recording an error of the Is having reduced below the It, and terminating the data file upon completion of the LC measurement,
- a step of instructing suspension of starting the measurement of the next sample if an error is displayed, and
- a step of instructing the automatic sampler to start the measurement of the next sample if no error is indicated.

Further, the present invention provides an electrospray ionization mass analysis apparatus similar to the above characterized by sequentially comprising:

- a step of introducing the aforementioned sample into the injector and micro column of the chromatograph in that order,
- a step of separating the sample for each component and ionizing it after feeding into the aforementioned ion source in conformity to the lapse of time,
- a step of repeating mass sweeping with the aforementioned mass spectrometer and storing the collected mass spectra into the control data processor,
- a step of measuring the current value (Is) of the ion having a specific mass, and comparing between the measured Is and the threshold value (It),
- a step of continuing measurement if Is exceeds It,
- a step of completing measurement if the Is is not below the It by the time the aforementioned measurement terminates, and starting measurement of the next sample,
- a step of measuring the Is at least once for each supply of the sample immediately before the column is brought into equilibrium by the solvent of the mobile phase prior to supply of the sample,
- a step of recording and displaying an error when the Is is reduced below the It,
- a step of stopping the measurement and suspending the supply of a new sample, and
- a step of continuing the measurement if the Is is above the It.

As described above, the present invention monitors the $Na^+$ ion that surely occurs in the ESI. When it has been reduced below the threshold value, measurement is stopped because clogging is assumed to have occurred. Further, the current value of the $Na^+$ ion is collected for each measurement and the time for reduction below the threshold value is estimated from their changes. This is indicated on the CRT or the like. In other words, in the micro LC and ESI, clogging of the ESI nozzle and capillary tube seriously deteriorates the throughput and data reliability. Sample waste can be minimized and reliability of acquired data can be improved by detecting this clogging and stopping measurement and introduction of the sample. Maintainability can be improved by predicting possible clogging.

BEST FORM OF EMBODIMENT OF THE PRESENT INVENTION

Figure 1:
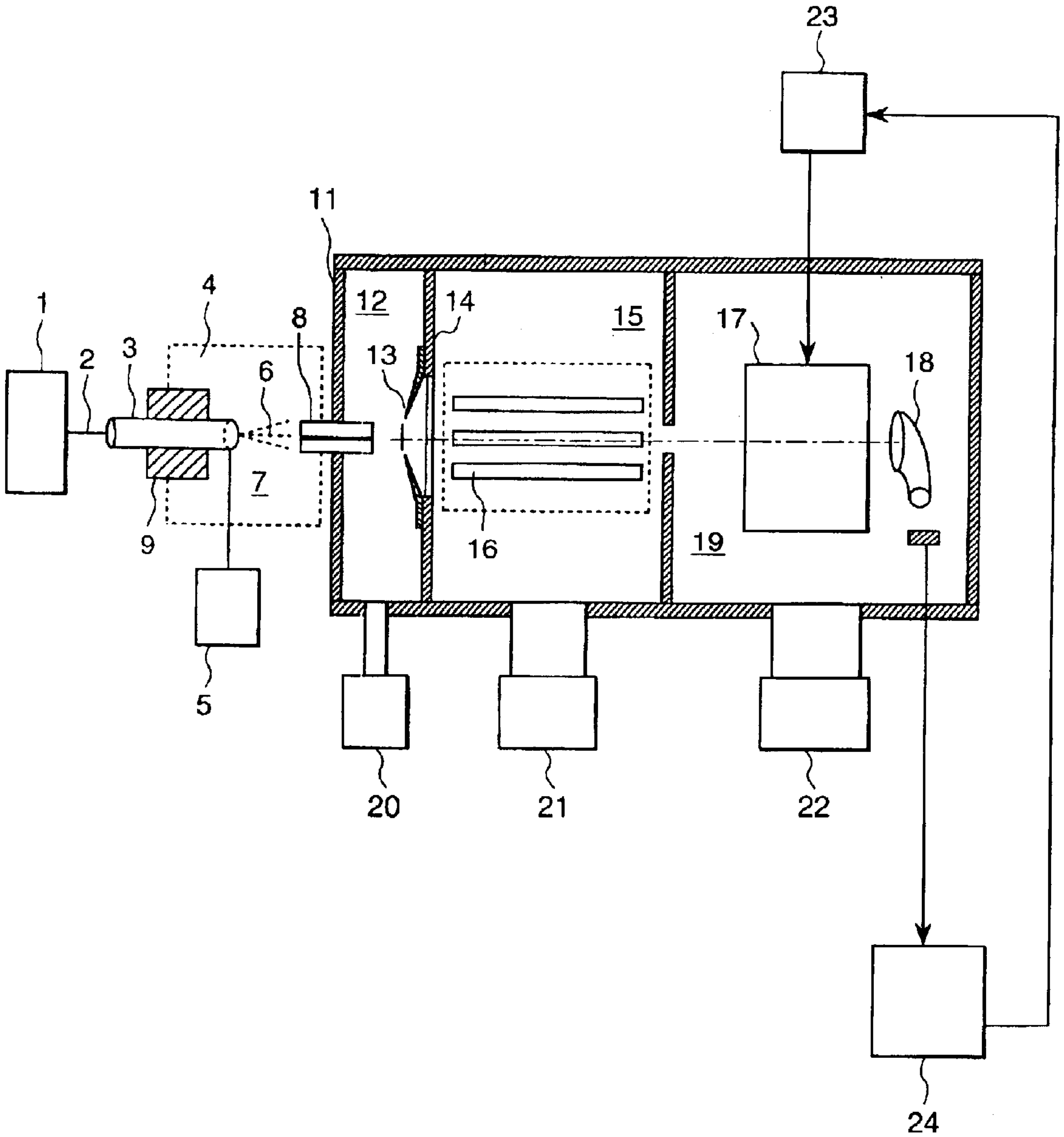
FIG. 1 is an overall configuration drawing of electrospray ionization mass analysis apparatus as an embodiment of the present invention.

FIG. 1 is an overall configuration drawing of electrospray ionization mass analysis apparatus as an embodiments of the present invention. Solution containing sample component separated by the micro LC 1 is sent to the ESI probe 3 of the ESI ion source 4 through a capillary tube 2. The ESI probe 3 is arranged on the XYZ three-axis positioning device 9. The sample solution sent from the micro LC 1 is fed to the ESI capillary tube nozzle 48 constituting the ESI probe 4 and a spray ion flow is formed as charged droplet 6 sprayed into the atmosphere from the nozzle tip. The charged droplet 6 is discharged in the form of ions into the atmosphere and is fed into a vacuum chamber 12 through a capillary tube 8 arranged on a vacuum partition 11. The mass analysis apparatus is composed of vacuum chambers 12, 15 and 19 having different pressures, and each chamber is evacuated by each of independent vacuum pumps 20, 21 and 22.

A skimmer is provided in the vacuum chamber 12, and ions guide 16 is arranged in the vacuum chamber 15. A mass spectrometer 17 and a detector 18 are disposed in the vacuum chamber 19 kept high vaccum. Ions are led into a mass spectrometer 17 through ions guide 16, and are subjected to mass analysis. When the voltage supplied from the mass sweep power supply 23 is swept, the ions are separated according to each mass, and ion current is detected by a detector 18. Ion current signal corresponding to each mass is fed to a control data processor 24, where it is collected as a mass spectrum.

The ion guide 16 consists of cylindrical electrodes formed by four, six and eight metallic rods arranged on a certain circumference at an equally spaced interval. These rods are wired alternately and high frequency is applied between two electrodes. When the ion is led onto the center axis of this ion guide, the ion is subjected to vibration by high frequency and is brought into collision with gas molecule to be converged on the ion guide axis. Ion can be transferred by this ion guide without being lost.

The capillary tube 8 is a pipe made of stainless steel, other metal or glass. Preferably, it has an inner diameter of 0.4 to 0.3 mm and a length of 10 cm. It is used with a heater disposed around it for heating.

In the ion trap mass spectrometer, the mass spectrometer 17 is composed of three electrodes as rotary symmetric elements of hyperbolic form and a toroidal ring electrode and two end cap electrodes sandwiching a ring electrode regionrranged. When main high frequency voltage is applied to the ring electrode from the main high frequency power source 23, a quadrupole electric field is formed in the space formed by the aforementioned three electrodes. The ion generated by the ESI ion source is fed to the vacuum space to reach the ion trap mass spectrometer through the skimmer and ion guide. Ions gate electrode is arranged in front of the ion trap electrode so that ion is led in ions trap or is blocked therefrom.

When voltage with the same polarity as that of the ion is applied to the ion gate electrode, ion will be blocked, namely, the ion gate is turned off. Conversely when voltage with the polarity reverse to that of the ion is applied, ion is led into the ion trap.

Ion can be also be stored in the ion trap as it is introduced for a predetermined time when the main high frequency wave is applied to the ring electrode. This ensures the average mass spectrum to be formed even if the amount of ion in the ion source fluctuates. The mass spectrum can be formed by performing MS/MS with the ion gate turned off and sweeping the main high frequency voltage applied to the ring electrode.

In the figure, numeral 4 denotes a ESI ion source, 5 a high voltage power source, 6 a spray ion flow, 7 a ion source space, 13 a skimmer, 14 a vacuum partition, 18 a detector, 49 a waste water bottle.

Figure 2:
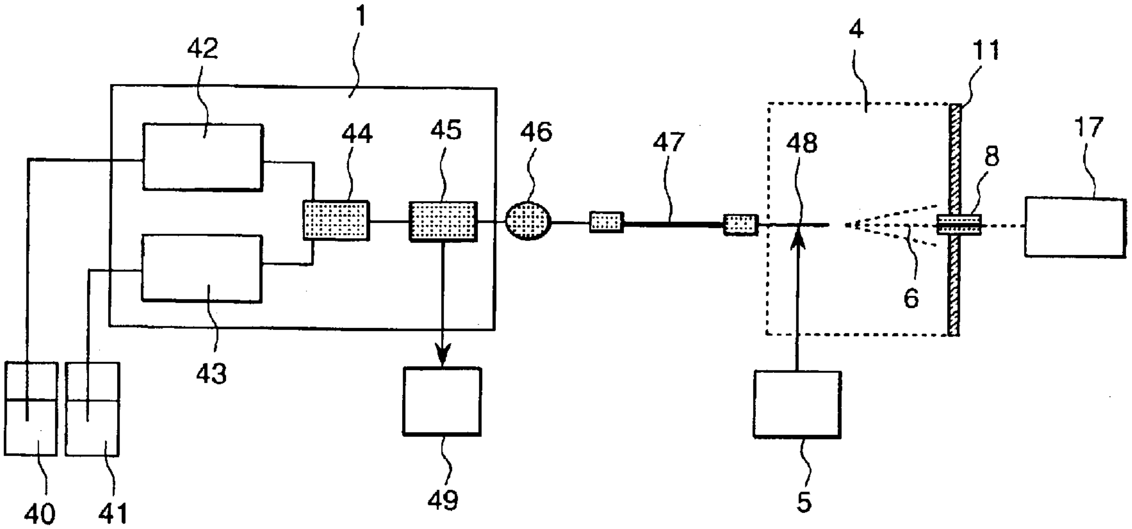
FIG. 2 is a configuration drawing representing a micro LC and ESI ion source as embodiments of the present invention.

FIG. 2 is a configuration drawing representing a micro LC 1 and ESI ion source. Two solvents in mobile phase are stored in solvent bottles 40 and 41, respectively. A micro mixer 44 mixes two solvents sucked and delivered by two pumps 42 and 43. The percentage composition of two solvents can be controlled by changing the amount delivered from the pump in conformity to the gradient parameter. The mixed solvents of mobile phase are split by a next flow splitter. The split ratio is normally set to 1/10 through 1/100, and can be set from the outside. The solvent of mobile phase split to 1 $\mu$L/min. through 10 $\mu$L/min. is fed to the micro column 47 through an injector 46.

Sample solution is introduced by the injector, and is separated by a micro column 47 for each component. The separated component is fed to the ESI nozzle 48. A high voltage of about several kV is supplied to the ESI nozzle 48 from a high voltage power supply 5. The sample solution is sprayed and ionized into the atmosphere by the high electric field generated on the tip of the ESI nozzle 48. The positive/negative ionization mode can be switched by changing over the polarity of high voltage applied to ESI nozzle 48.

Figure 3:
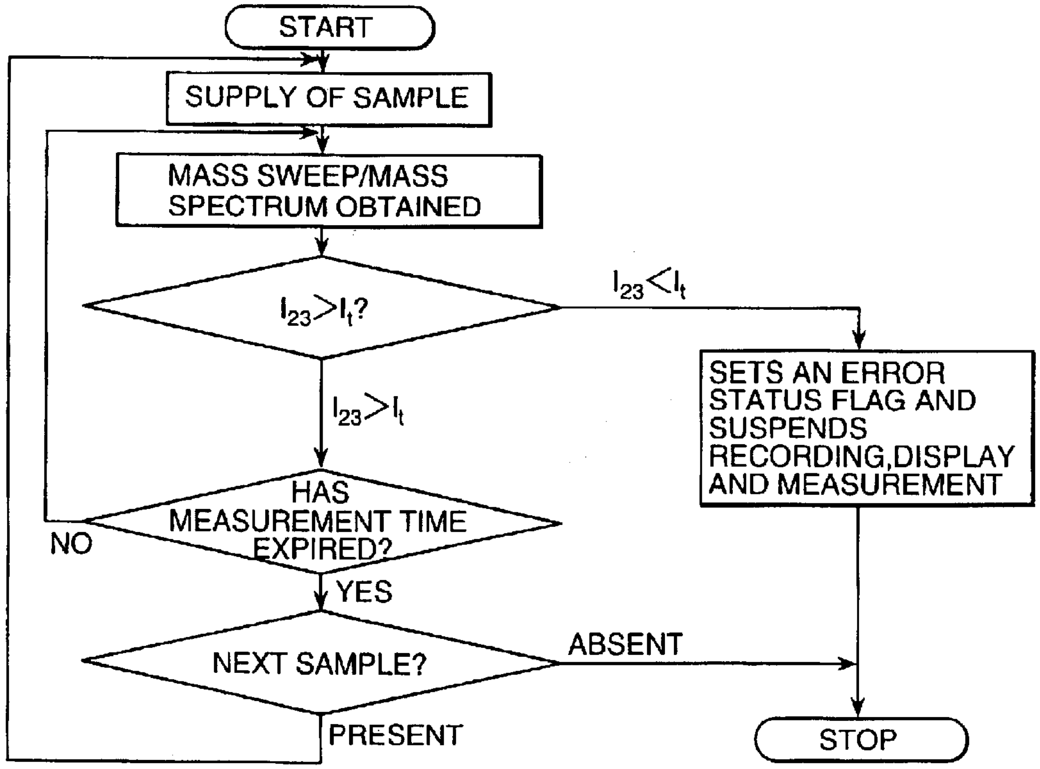
FIG. 3 is a drawing representing the operation flow as an embodiment of the present invention.

FIG. 3 is a flow chart representing the operation according to repeated mass spectrum collection and $Na^+$ ion monitoring method. The LC/MS analysis starts and the sample is fed to a micro column 47 from the injector 46. The sample is separated for each component, and is fed to the ESI ion source 4 with the lapse of time, where it is ionized. The mass spectrometer repeats mass sweeping, and the mass spectra are collected repeatedly. The mass spectrum is stored in the control data processor.

The current value $I_{23}$ of the ion of mass 23 is compared with the threshold value It. If $I_{23}$ has exceeded It ($I_{23}$>It), measurement is continued. If the $I_{23}$ is not reduced below the It by the time the measurement terminates, measurement is assumed to have been completed correctly. The data are processed and the file is terminated. This is followed by the step of measuring the next sample.

If the micro column is clogged at a certain time period, the amount of $Na^+$ ion undergoes an abrupt reduction, with the result that measurement $I_{23}$ is reduced below It ($I_{23}$<It). The control data processor sets an error flag to start taking action against the error. Namely, action is taken to ensure that sweep start command is not sent to a mass sweep power source 23, whereby collection of mass spectrum is suspended. Further, abnormal suspension is recorded in the data and the file is terminated. An error message is displayed on the CRT.

Even after completion of the LC measurement of this sample, the control data processor does not sent to the automatic sampler the signal to start the measurement of the next sample. This suspends introduction of the sample after the error has occurred, with the result that waste of the sample can be avoided.

Figure 4:
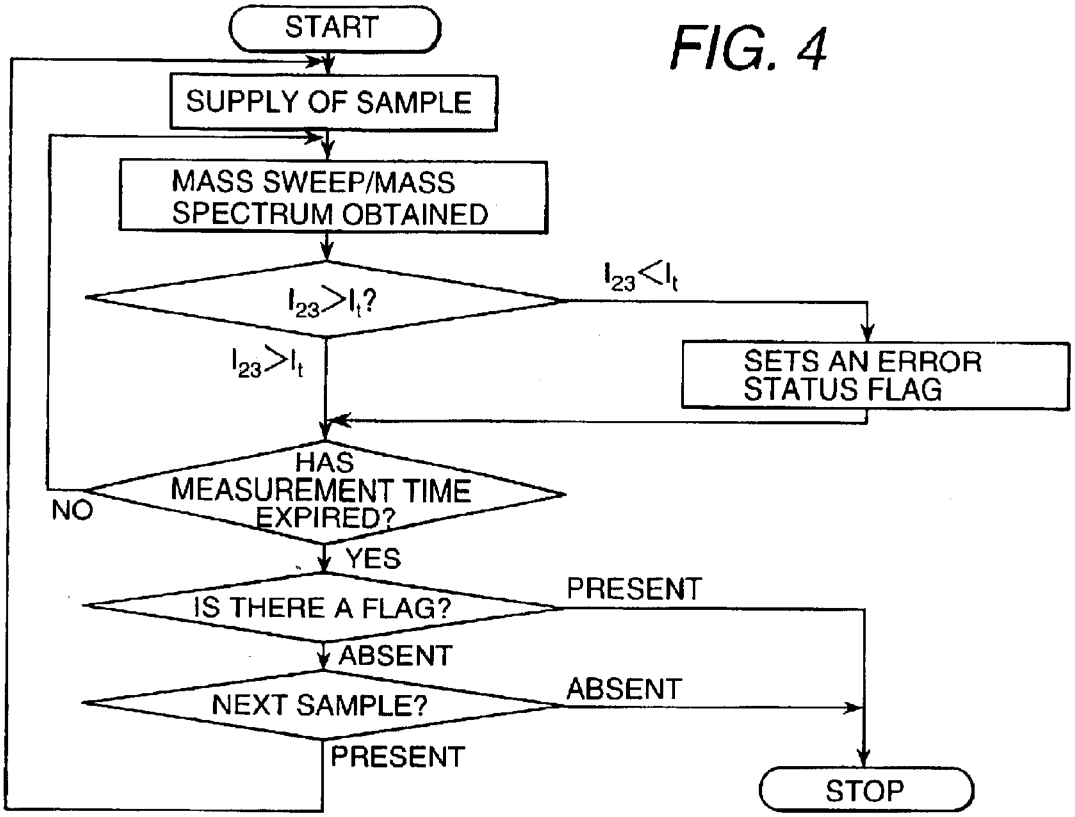
FIG. 4 is another drawing representing the operation flow as an embodiment of the present invention.

FIG. 4 is a flow chart representing the operation according to the method where an error state is recorded in the data without suspending the measurement despite occurrence of the error status. In the example shown in FIG. 3, the collection of the mass spectrum was suspended when an abnormal reduction of $I_{23}$ due to clogging of the micro column had been detected. In FIG. 4, however, the collection of mass spectrum is not suspended as long as the LC measurement of one sample continues, and an error flag is set. When the LC measurement has terminated at the expiration of the measurement time, a error status is recorded in the data to indicate that the $I_{23}$ has reduced below the It. Then the data file is terminated. Here the error flag is checked. If an error flag is set, the measurement of the next sample is not started. If no flag is set, it sends to the automatic sampler a command to start the measurement of the next sample.

Figure 5:
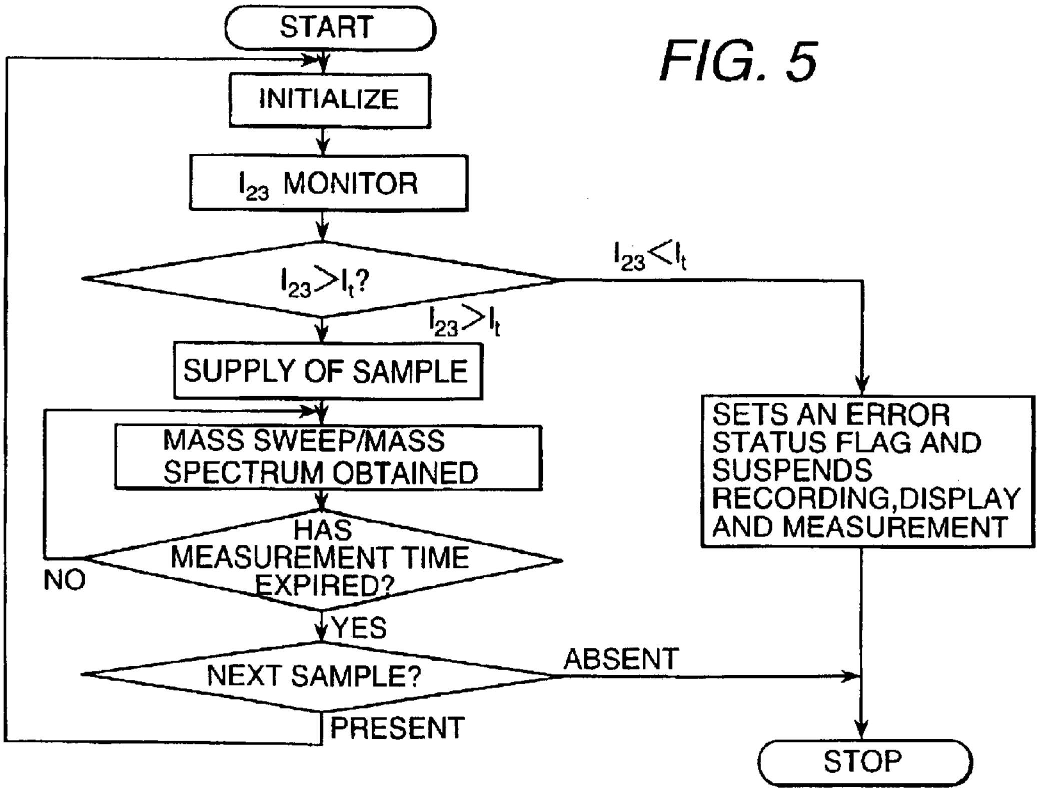
FIG. 5 is a further drawing representing the operation flow as an embodiment of the present invention.

FIG. 5 is a flow chart representing the operation according to the method where the $I_{23}$ is monitored before the sample is supplied. The clogging of the micro column, pipe or ESI nozzle may be monitored once or several times for each sample supply by the $I_{23}$, without being monitored at all times. Generally, in order to ensure measurement characterized by excellent reproducibility in the LC analysis, initialization of LC is essential; namely, the column must be equilibrated by the solvent of mobile phase before the sample is supplied. It is also possible to monitor $Na^+$ and $Cl^-$ ions immediately before this initialization terminates.

When a series of samples are to be measured, initialization is often carried out under one and the same conditions. Then ion monitoring conditions are matched conveniently. If the $I_{23}$ is reduced below the threshold value due to clogging, an error flag is set. The error is recorded in the data and the error status is displayed on the CRT. Then the measurement is stopped. In other words, no new sample is supplied. If the $I_{23}$ is greater than the threshold value, measurement is continued. Judgment of $I_{23}$ against noise can be reinforced by taking an average of ion current values of $I_{23}$ instead of one. Further, the ion can be monitored once at predetermined time intervals, e.g. every ten minutes.

Figure 6:
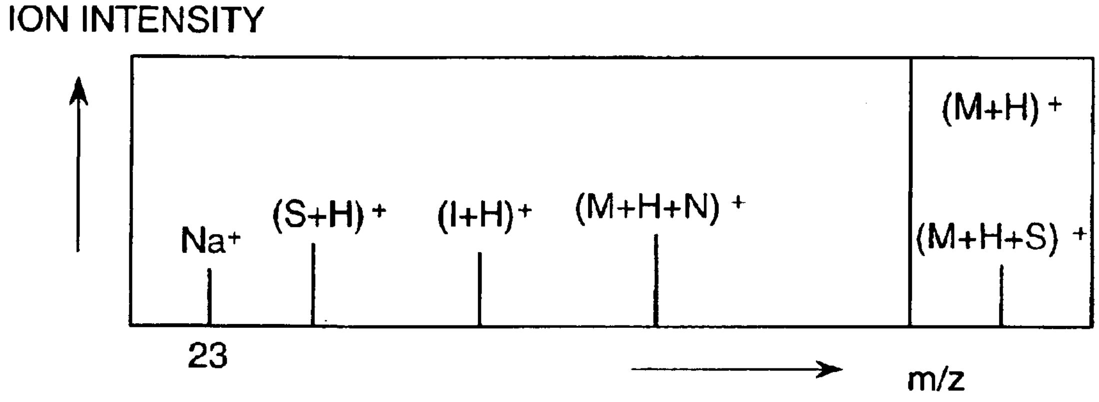
FIG. 6 is an explanatory diagram of a mass spectrum in the ESI positive ion mode.

FIG. 6 is an explanatory diagram of a typical mass spectrum in the ESI positive ion mode. Generally, the mass spectrum is composed of many ion species. In the low mass region, ammonium ion NH4 with a mass number of several m/z=18, alkali metal ion such as $Na^+$ ion with a mass number of m/z=23, or $(NH_4^++S)^+$ and $(Na^+S)^+$ ions formed by adding solvent molecular S to these ions often appear. The sample led to the ESI ion source is a mixture in many cases. In such cases, ions $(I+H)^+$ derived from impurities in sample appears. Further, pseudomolecular ion $(M+H)^+$ derived from the main component and fragment ion $(M+H-N)^+$ formed by cleavage of pseudomolecular ion appear. $(M+H+S)^+$ and the like formed by addition of solvent molecule to the pseudomolecular ion appear in the higher mass the mass of region than pseudomolecular ion.

Figure 7:
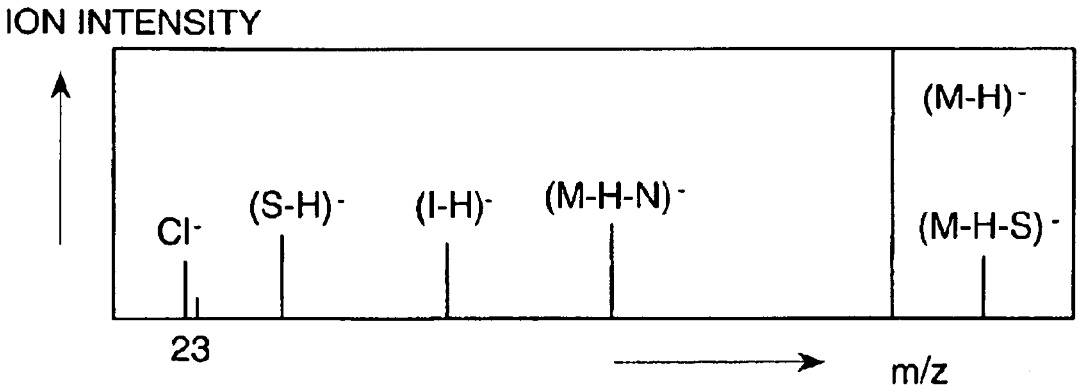
FIG. 7 is an explanatory diagram of a mass spectrum in the ESI negative ion mode.

FIG. 7 is an explanatory diagram of a mass spectrum in the ESI negative ion mode. Similarly to the case of positive ion mode, the mass spectrum consists of many ion species. $Cl^-$, $SO_4H^-$, $(S-H)^-$ and ions formed by adding solvent molecules to these ions appear in the low mass region, Further, ions $(I-H)^-$ derived from the impurities in sample appear. Pseudomolecular ion $(M-H)^+$ derived from the main component and fragment ion $(M-H+N)^-$ formed by cleavage of pseudomolecular ion appear. $(M-H+S)^-$ and the like formed by addition of solvent molecule to the pseudomolecular ion appear in the higher-mass region than the mass of pseudomolecular ion.

As described above, in the low mass region, $Na^+$ and $Cl^-$ ions unrelated to the sample or mobile phase are often observed. This is because a trace quantity of NaCl and other salts as impurities are present in the sample and solvent, and LC/MS apparatus is slightly contaminated by NaCl, etc. Especially the $Na^+$ and $Cl^-$ ions are not generated in the atmospheric chemical ionization (APCI) resulting from corona discharge; $Na^+$ or $Cl^-$ ions pertain to ion species which can be detected only by ESI. Consequently, when the apparatus is started, a person in charge of measurement can make sure of the smooth operation of the apparatus by introducing only the solvent into the ESI ion source and observing the presence of $Na^+$ or $Cl^-$ ions in the mass spectrum.

In the present invention, $Na^+$ ion is observed in the positive ion mode and $Cl^-$ ion is observed in the negative ion mode. By checking if the ion current value exceeds the threshold value, evaluation is made to determine if the ESI is correctly operating or not.

In the positive ion mode, $NH_4^+$ or the like can be adopted as ion species to be monitored. It is possible to mix a trace quantity of triethylamine in the mobile phase and to monitor its pseudomolecular ion $(C_2H_5)_3NH^+$. Namely, for the ion species to be monitored, the mass can be selected and set in response to measurement.

Figure 8:
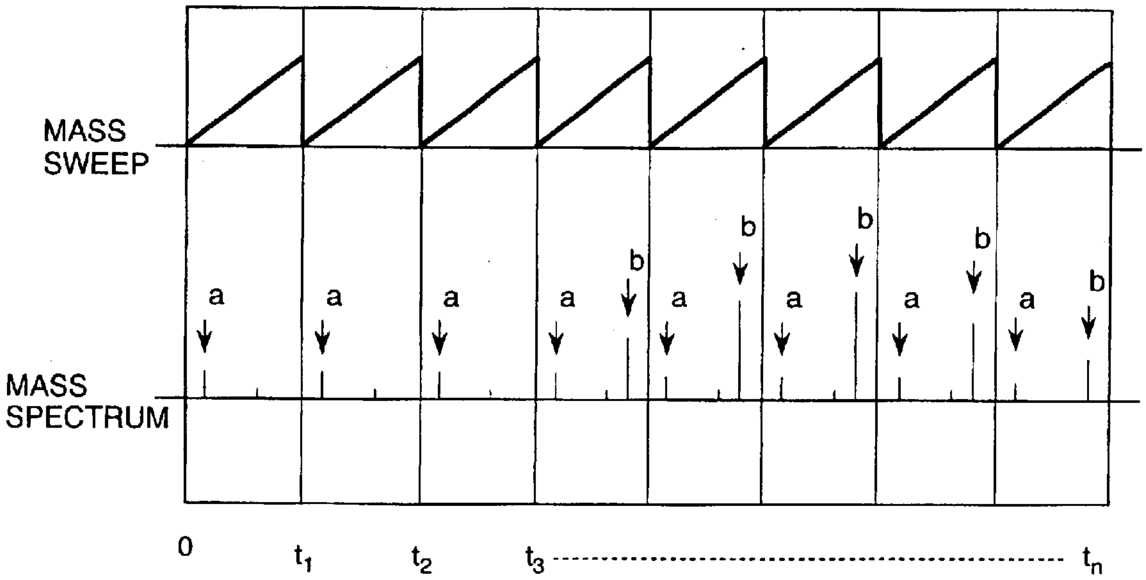
FIG. 8 is an explanatory diagram representing the measurement operation according to the present invention.

FIG. 8 is a schematic diagram representing the measurement operation. Mass sweeping is repeated at predetermined intervals 0 to $t_1$, $t_1$ to $t_2$, and $t_2$ to $t_3$. According to this mass sweeping, the mass spectrum is collected repeatedly. Assume that ion a is the ion to be monitored. It is observed on the mass spectrum, independently of the presence or absence of the sample component. This ion current is traced to create a mass chromatogram. When the sample component is introduced into the ESI ion source, pseudomolecular ion b is increased by the corresponding amount.

Figure 9:
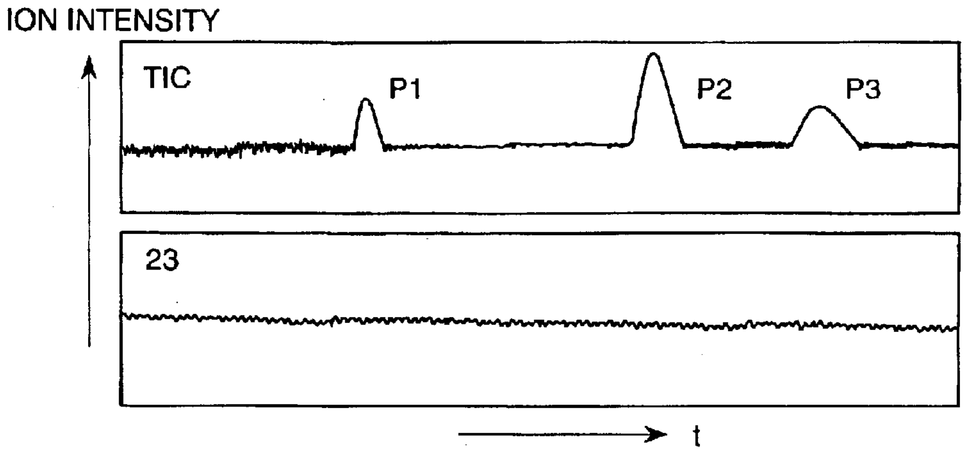
FIG. 9 is an explanatory diagram of a mass chromatogram according to the present invention.

FIG. 9 is a diagram showing the result arranged in the form of a mass chromatogram by the control data processor. The chromatogram on the upper stage of FIG. 9 is formed by tracing the integration of the ion current in a certain range. It is called total ion chromatogram (TIC). Here three components are detected. Although there is a slight waviness or fluctuation of $Na^+$ ion while three components are eluted, an almost flat mass chromatogram is provided. This shows that the micro LC and ESI are operating properly.

Figure 10:
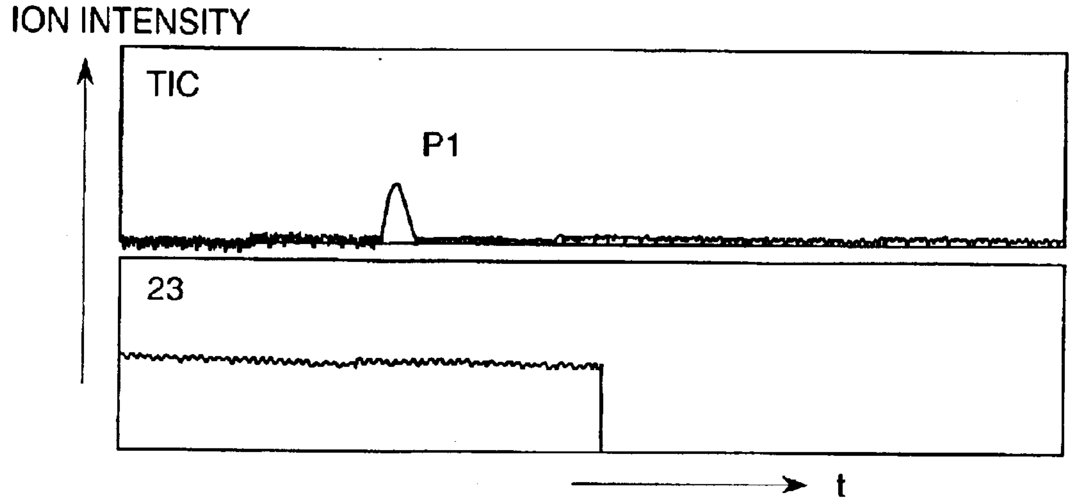
FIG. 10 is an explanatory diagram of a mass chromatogram according to the present invention when the ESI nozzle is clogged in the middle of measurement.
Figure 11:
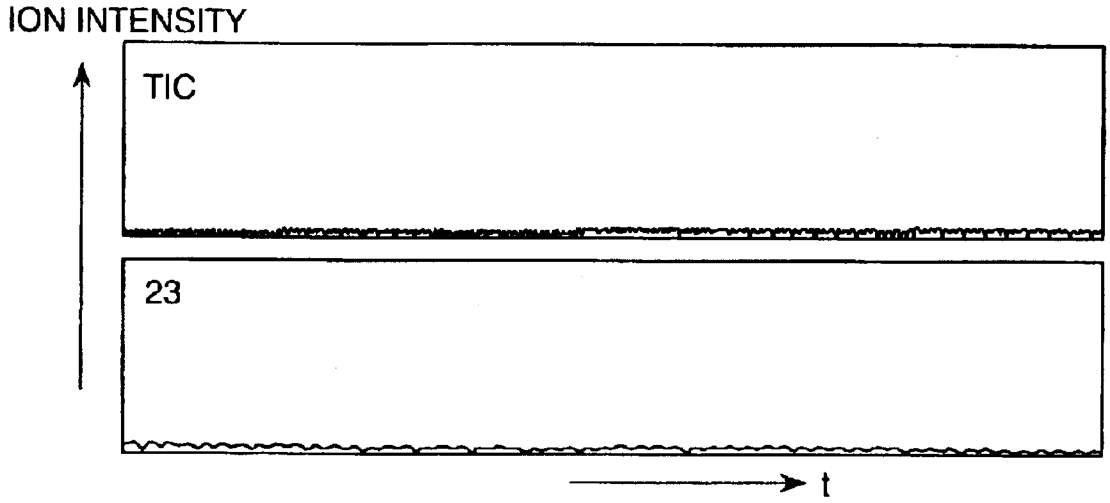
FIG. 11 is an explanatory diagram of a mass chromatogram according to the present invention when the ESI nozzle is clogged from the start of measurement.

FIG. 10 shows an example when the ESI nozzle is clogged in the middle of measurement. It is estimated that $Na^+$ ion current is reduced to zero in the middle of measurement, with the result that the ESI nozzle is clogged. In TIC, on the other hand, the components eluted before clogging are detected as a peaks. If clogging occurs in the middle of measurement, the sample component is not introduced into the ESI ion source, so the subsequent components are not detected. The base line is traced by the ITC. If only the TIC trace is observed without the $Na^+$ ion being monitored, it is highly possible to arrive at a misunderstanding that this sample originally contains only one component. An error can be easily identified by measurement of the $Na^+$ ion. Consequently, the supply and measurement of the next sample are stopped, whereby waste of a precious sample can be avoided. If the measurement is continued without $Na^+$ ion being monitored, a large volume of meaningless data corresponding to that of FIG. 11 will be stored in the control data processor. Not only that, the sample will be wasted. In this case, the person in charge of measurement will find it difficult to determine if such data has been formed because the sample had not originally included the components to be measured, or measurement has not been carried out appropriately.

Figure 12:
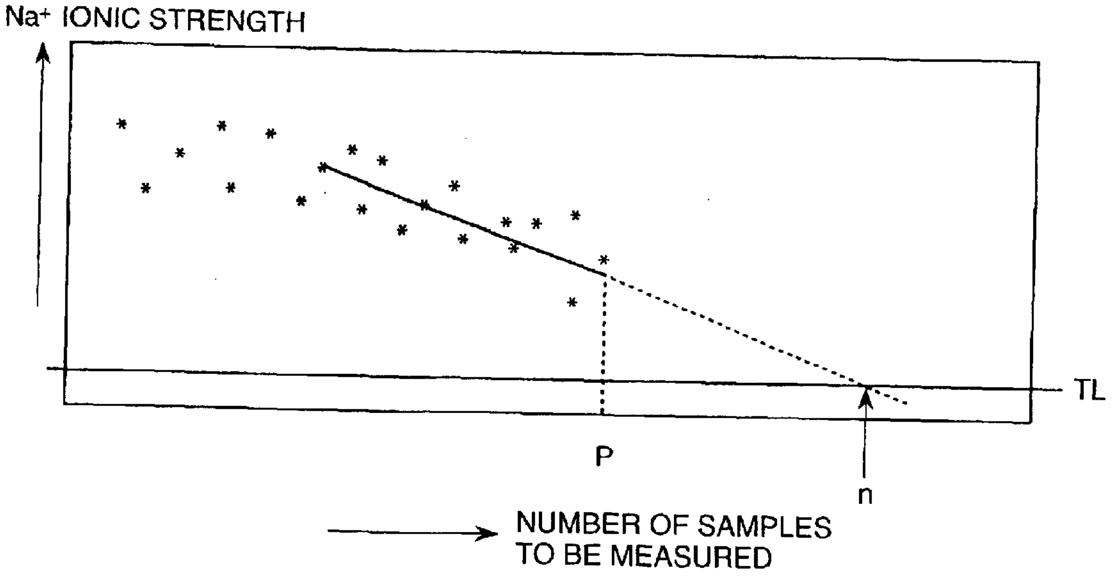
FIG. 12 is an explanatory diagram representing the method for predicting the clogging of the ESI nozzle.

FIG. 12 is another embodiment of the present invention. Clogging of the micro column or ESI may occur suddenly, but in many cases, non-volatile components are deposited on the inner wall of the capillary tube gradually to clog the capillary tube in the final stage. If gradual narrowing of the capillary tube can be predicted in advance, the person in charge of measurement can feel easy about proceeding with measurement.

FIG. 12 is a diagram representing the relationship between the ion current of $Na^+$ ion and number of measurements. In the step of initialization prior to supply of the sample, the current of a specific ion is monitored and is recorded by the control data processor. The correlation between the ion current value and the number of measurements (n) is found out. If the slope of this primary function formed from the correlation is negative, an approximate function is extrapolated, and a crossing point "n" with the level of clogging (TL) is formed. Thus, the difference (n−P) from the current measuring point P, namely, the predicted point "n" denotes the number of times before clogging occurs. If (n−P) has a sufficient margin, measurement can be continued. However, if (n−P) is reduced, an alarm is issued to the CRT or the like, and the measurement of precious samples can be avoided in this stage. It is also possible to prepare or replace the column, capillary tube or nozzle at an earlier stage.

Figure 13:
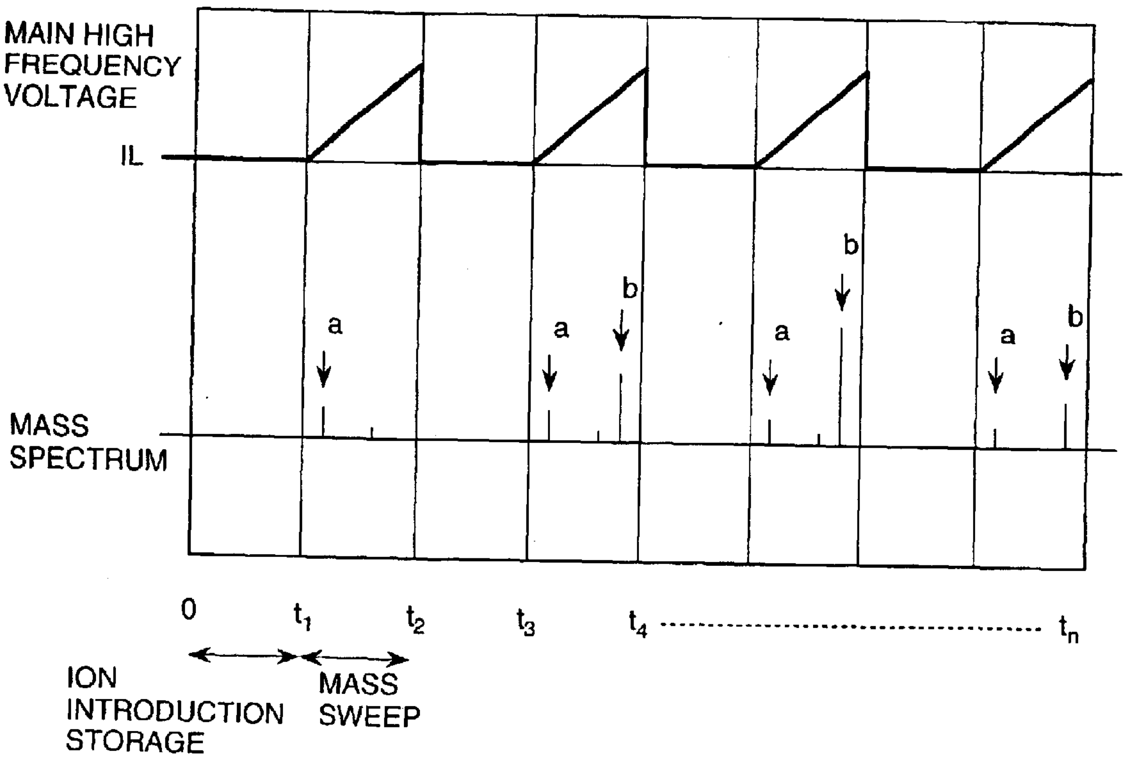
FIG. 13 is an explanatory diagram representing the measurement operation using ions trap mass spectrometer according to the present invention.
Figure 14:
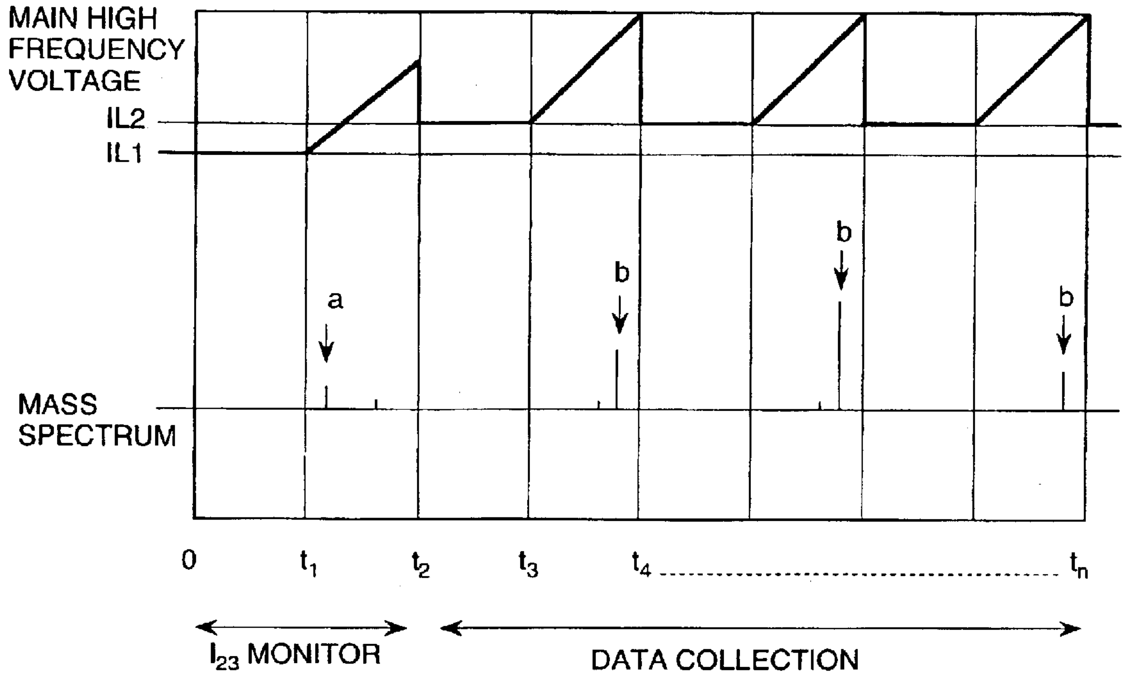
FIG. 14 is another explanatory diagram representing the measurement operation using ions trap mass spectrometer according to the present invention.

FIGS. 13 and 14 show a further embodiment of the present invention. Mass spectrometers that are based on a different principle as a LC/MS is used at present. They include a quadrupole MS (QMS), magnetic field type MS, TOF, ion trap MS, and ion cyclotron resonance MS (ICRMS). The ion trap MS and ion cyclotron resonance MS (ICRMS) regionlso called ion storage type MS, based on the operating principle different from those of other MSs.

The ion trap MS is a small sized MS where two end cap electrodes of rotary hyperbolic surface are opposed to each other so as to sandwich the toroidal ring electrode. The main high frequency voltage is applied to the ring electrode and ions are trapped in ions trap space enclosed by three electrodes. Then the main high frequency voltage is swept, and ions are released from the ion trap space sequentially in the order of mass. The mass spectrum can be formed by detecting the released ion. Unlike the QMS or the like, the ion trap MS allows ion introduction/storage and mass sweep/mass spectrum acquisition to be performed on a time division basis. As shown in FIG. 13, "0 to $t_1$" is the time period for ion introduction and storage, when the ion generated by the ESI ion source is introduced and stored into the ion trap space. During this time, the main high frequency voltage is set at a lower level so that ions over a wide mass range can be trapped. During the time period of "$t_1$ to $t_2$", ion introduction is stopped, and the main high frequency voltage is swept to acquire the mass spectrum.

Namely, during the period of 0 to $t_2$, one mass spectrum is acquired. This step is repeated to perform LC/MS measurement. $Na^+$ ion has a mass of 23. The main high frequency voltage (referred to as "IL") to be set during the ion introduction and storage period must be a low voltage where $Na^+$ ion can be trapped. The maximum mass that allows an effective trapping of ions into the ion trap is assumed as about 30 times the IL. If the IL is 20 to ensure that $Na^+$ ion can be trapped, the maximum mass will be 20*30=600. If the IL is reduced to ensure that $Na^+$ ion can be trapped, then ions of peptide and protein having a mass of 600 or greater cannot be trapped; namely, they cannot be measured. Symbol "a" in FIG. 13 denotes the $Na^+$ ion. The ion "b" having a mass of 600 or smaller can be measured.

FIG. 14 shows a method for measuring a high mass ion and $Na^+$ ion. The "0 to $t_1$" indicates the time period for ion introduction and storage. During this period, The ion level IL1 is set to 20 or smaller, and $Na^+$ ion is trapped. During the period "$t_1$ to $t_2$", the main high frequency voltage is swept and the current value $I_{23}$ of $Na^+$ ion is formed. Then during the period "$t_2$ to $t_3$", the ion level (IL2) is set to about 70 to provide against a high mass sample. This will allow ions having a mass of 70 to about 2000 to be trapped. During the period "$t_3$ to $t_4$", the mass from 70 to 2,000 is swept to get the mass spectrum. In the period "$t_4$ to $t_n$", successive trapping of high mass ions and acquisition of mass spectrum are repeated. The cycle of mass spectrum acquisition is about 0.2 seconds, so clogging can be detected even if $Na^+$ ion is assumed to be monitored once for 100 acquisitions of high mass spectrum.

In the case of ion trap MS, monitoring of $Na^+$ ion of low mass and acquisition of high mass spectrum can be made compatible by adjusting the ion level IL.

Comparison between ion current value and threshold value is intended to distinguish between the noise of the detector and actual signals. The setting of the threshold value can be changed in conformity to the conditions of the apparatus.

The above has mainly described the coupling between the ESI and micro LC. The present invention is also applicable to the coupling between various types of chromatography including the conventional LC, semi-micro LC, micro LC and CE, and ESI or its improved ionization arts including ion spray, sonic spray and nano spray.

It has been described in the above that reduction of the $I_{23}$ is mainly caused by clogging of the capillary tube. Reduction of the $I_{23}$ can also be caused by fluctuation of spraying due to contamination of the ESI nozzle tip or deflection of the spray direction. In this case, there is a substantial reduction in the ion current value of the component to be measured. Consequently, it is still an effective method to monitor the $I_{23}$ and, if the result is below the threshold value, it is assumed as an error, even if it results from different causes.

In the above description, $Na^+$ ion is used to explain the ion species to be monitored. $Cl^{31}$ or other ion species (e.g. $NH_4^+$) may also be used. Any ion species will be acceptable if it is stably present during measurement, independently of LC conditions. So in addition to the $Na^+$ occurring as background ion, it is also possible to use the $NH_4^+$ ion that appears by mixing a very small amount of ammonium acetate $CH_3CO_2NH_4$ or the like in the LC eluent.

Industrial Field of Application

Since the flow rate of the micro LC/MS is low, the dead volume must be minimized or the diameter of the capillary tube must be reduced. Further, the sample and salt are likely to deposit in the capillary tube due to low flow rate, with the result that clogging of the capillary tube and ESI nozzle often occurs. The present invention provides an electrospray ionization mass analysis apparatus and its system that ensures clogging to be predicted, or detected immediately when it has occurred, thereby suspending measurement to prevent samples from being wasted, and improving the reliability of the formed data and the maintainability through earlier replacement of a clogged component.

What is claimed is:

1. An electrospray ionization mass analysis apparatus wherein a sample solution from a chromatograph is introduced into a capillary tube, and an electrospray ion source arranged for generating ions under atmospheric pressure generates ions, which are led into a mass spectrometer disposed in a vacuum chamber where said ions are subjected to mass analysis;

said electrospray ionization mass analysis apparatus further characterized in that;

the current value or strength of the ion having a specified mass in said sample solution is measured, and, when said current value has reduced below a threshold value, an error state is displayed.

2. An electrospray ionization mass analysis apparatus according to claim 1 characterized in that said current value or strength are measured prior to supply of said sample, and said current value is compared with a threshold value.

3. An electrospray ionization mass analysis apparatus according to claim 2 characterized in that comparison between said ion current value with said threshold value is carried out at a predetermined interval subsequent to supply of said sample.

4. An electrospray ionization mass analysis apparatus according to claim 3 characterized in that said error status is recorded in the data.

5. An electrospray ionization mass analysis apparatus according to claim 4 characterized in that, when said error status is displayed, the data is saved and the measurement in mass analysis is then suspended.

6. An electrospray ionization mass analysis apparatus according to claim 5 characterized in that, when said error status is displayed prior to supply of said sample, a command is issued to suspend supply of said sample.

7. An electrospray ionization mass analysis apparatus according to claim 6 characterized in that the setting of the mass of said ion for monitoring said measured ion current value or strength can be changed from the outside.

8. An electrospray ionization mass analysis apparatus according to claim 7 characterized in that the setting of said threshold value can be changed from the outside.

9. An electrospray ionization mass analysis apparatus according to claim 8 characterized in that, in the positive ion measurement mode, the mass of said ion to be monitored is 23.

10. An electrospray ionization mass analysis apparatus according to claim 9 characterized in that, in the negative ion measurement mode, the mass of said ion to be monitored is 35.

11. An electrospray ionization mass analysis apparatus wherein a sample solution from a chromatograph is introduced into a capillary tube, and an electrospray ion source arranged for generating ions under atmospheric pressure generates ions, which are led into a mass spectrometer disposed in a vacuum chamber where said ions are subjected to mass analysis;

said electrospray ionization mass analysis apparatus further characterized in that;

the current value or strength of the ion having a specified mass in said sample solution is measured and stored for multiple samples, the number of measurements where said ion current value or strength is below said threshold value is predicted based on the relationship between said multiple ion current values or strengths and the number of measurements, and an error state is displayed in conformity to said predicted number of measurements.

12. An electrospray ionization mass analysis apparatus according to claim 11 characterized in that said ion current value is measured prior to supply of said sample.

13. An electrospray ionization mass analysis apparatus wherein;

a sample solution from a chromatograph is introduced into a capillary tube, and an electrospray ion source arranged for generating ions under atmospheric pressure generates ions, which are led into a mass spectrometer disposed in a vacuum chamber where said ions are subjected to mass analysis;

said electrospray ionization mass analysis apparatus comprising ion level setting means where, during the time when the current value of the ion having a specific mass is measured, the level of the ion to be trapped is set to a level lower than that of said specific mass and, at other times, the level of the ion to be trapped is set to a level higher than that of said specific mass.

14. An electrospray ionization mass analysis apparatus wherein a sample solution separated from a micro liquid chromatograph arranged for separating a sample solution is introduced into a capillary tube, high voltage is applied from a high voltage power source connected to the tip of said capillary tube and a counter electrode having an aperture;

whereby a spray ion flow is generated from the tip of said capillary tube toward said aperture by an electrospray ion source, said ion flow generated by said ion source is introduced through said aperture to a skimmer cone and ion guide disposed in a vacuum chamber, and then to ions storage type mass spectrometer, where said ion is subjected to mass sweeping and is detected by a detector to obtain mass spectrum;

said electrospray ionization mass analysis apparatus further characterized in that the current value or strength of the ion having a specified mass in said sample solution is measured, and, when said current value has reduced below a threshold value, an error state is displayed.

15. An electrospray ionization mass analysis apparatus according to claim 14 characterized in that said skimmer, ion guide and ion storage type mass spectrometer are each disposed integrally in each vacuum chamber, which is provided with a vacuum pump.

16. An electrospray ionization mass analysis apparatus according to claim 15 characterized by comprising an XYZ3 axis positioner for setting said spray ion flow with respect to said capillary tube.

17. An electrospray ionization mass analysis apparatus according to claim 13 or 14 characterized in that said ion storage type mass spectrometer is ions trap mass spectrometer.

18. An electrospray ionization mass analysis apparatus according to claim 13 or 14 characterized in that said ion storage type mass spectrometer is ions cyclotron resonance (ICR) mass spectrometer.

19. An electrospray ionization mass analysis system wherein;

a sample solution from a chromatograph is introduced into a capillary tube, and high voltage is applied to the tip of said capillary tube under atmospheric pressure whereby spray ions are generated, and are then led into a mass spectrometer disposed in a vacuum chamber where said ions are subjected to mass analysis;

said electrospray ionization mass analysis apparatus further characterized in that; the current value or strength of the ion having a specified mass in said sample solution is measured, and, when said current value has reduced below a threshold value, an error state is displayed.

20. An electrospray ionization mass analysis system wherein;

a sample solution from a chromatograph is introduced into a capillary tube, and an electrospray ion source arranged for generating a spray ion wider atmospheric pressure generates ions, which are led into a mass spectrometer disposed in a vacuum chamber where said ions are subjected to mass analysis;

said electrospray ionization mass analysis apparatus further characterized in that;

the current value or strength of the ion having a specified mass in said sample solution is measured and stored for multiple samples, the number of measurements where said ion current value or strength is below said threshold value is predicted based on the relationship between said multiple ion current values or strengths and the number of measurements, and an error state is displayed in conformity to said predicted number of measurements.

21. An electrospray ionization mass analysis system wherein;

a sample solution from a chromatograph is introduced into a capillary tube, and an electrospray ion source arranged for generating ions under atmospheric pressure generates ions,, which are led into an ion trap mass spectrometer disposed in a vacuum chamber where said ions are subjected to mass analysis;

said electrospray ionization mass analysis apparatus further characterized in that;

during the time when the current value or strength of the ion having a specific mass in said spray ion are measured, the level of the ion to be trapped is set to a level lower than that of said specific mass and, when they are not measured, the level of the ion to be trapped is set to a level higher than that of said specific mass.

22. An electrospray ionization mass analysis apparatus wherein;

a sample solution from a chromatograph is introduced into a capillary tube, and an electrospray ion source arranged for generating ions under atmospheric pressure generates ions, which are led into a mass spectrometer disposed in a vacuum chamber where said ions are subjected to mass analysis;

said electrospray ionization mass analysis apparatus further characterized by sequentially comprising:

a step of introducing said sample into the injector and micro column of the chromatograph in that order, a step of separating the sample for each component and ionizing it after feeding into said ion source in conformity to the lapse of time, a step of repeating mass sweeping with said mass spectrometer and storing the collected mass spectra into the control data processor, a step of measuring the current value (Is) of the ion having a specific mass in the sample, and comparing between the measured Is and the threshold value (It), a step of continuing measurement if Is exceeds It, a step of completing measurement if the Is is not below the It by the time said measurement terminates, and starting measurement of the next sample, a step of indicating an error through the control data processor if the error has occurred where the Is is reduced below the It due to sudden reduction of the Is, and specifying the action to be taken to countermeasure against the error, a step of giving a command of suspending start of sweeping to the mass sweep power source of the mass spectrometer to suspend the collection of mass spectra, a step of recording an error in the data and displaying that warning, and a step of suspending transmission of the signal for starting the next sample measurement to an automatic sampler.

23. An electrospray ionization mass analysis system wherein;

a sample solution from a chromatograph is introduced into a capillary tube, and an electrospray ion source arranged for generating ions under atmospheric pressure generates ions, which are led into a mass spectrometer disposed in a vacuum chamber where mass spectrum is given;

said electrospray ionization mass analysis apparatus further characterized by sequentially comprising:

a step of introducing said sample into the injector and micro column of the chromatograph in that order, a step of separating the sample for each component and ionizing it after feeding into said ion source in conformity to the lapse of time, a step of repeating mass sweeping with said mass spectrometer and storing the collected mass spectra into the control data processor, a step of measuring the current value (Is) of the ion containing a specific mass, and comparing between the measured Is and the threshold value (It), a step of having measurement if Is exceeds It, a step of completing measurement if the Is is not below the by the time said measurement terminates, and starting measurement of the next sample, a step of suspending the collection of mass spectra due to abrupt reduction of the Is, a step of indicating an error without suspending the collection of mass spectra during the measurement of one sample by liquid chromatograph (LC), a step of recording an error of the Is having reduced below the It, and terminating the data file upon completion of the LC measurement, a step of instructing suspension of starting the measurement of the next sample if an error is displayed, and a step of instructing the automatic sampler to start the measurement of the next sample if no error is indicated.

24. An electrospray ionization mass analysis system wherein;

a sample solution from a chromatograph is introduced into a capillary tube, and an electrospray ion source arranged for generating ions under atmospheric pressure generates ions, which are led into a mass spectrometer disposed in a vacuum chamber where mass spectrum is given;

said electrospray ionization mass analysis apparatus further characterized by sequentially comprising:

a step of introducing said sample into the injector and micro column of the chromatograph in that order, a step of separating the sample for each component and ionizing it after feeding into said ion source in conformity to the lapse of time, a step of repeating mass sweeping with said mass spectrometer and storing the collected mass spectra into the control data processor, a step of measuring the current value (Is) of the ion having a specific mass, and comparing between the measured Is and the threshold value (It), a step of continuing measurement if Is exceeds It, a step of completing measurement if the Is is not below the It by the time said measurement terminates, and starting measurement of the next sample, a step of measuring the Is at least once for each supply of the sample immediately before the column is brought into equilibrium by the solvent of the mobile phase prior to supply of the sample, a step of recording and displaying an error when the Is is reduced below the It, a step of stopping the measurement and suspending the supply of a new sample, and a step of continuing the measurement if the Is is above the It.

* * * * *